Aug. 14, 1951 R. H. DREISBACH 2,564,054
PHONOGRAPH PICKUP AND MECHANICAL MOTION CONVERTING SYSTEM THEREFOR
Filed Oct. 10, 1947
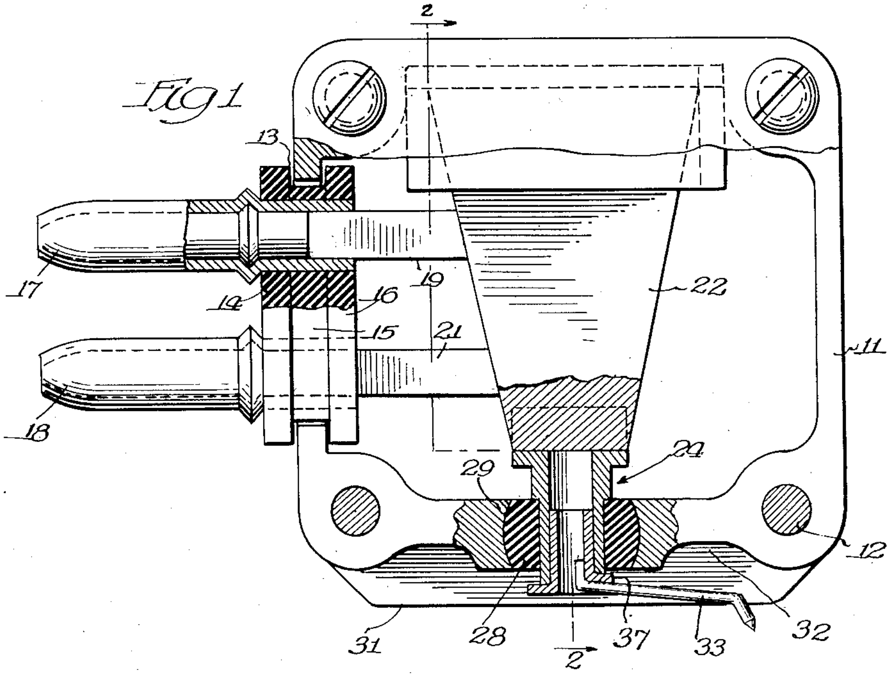
Fig. 1
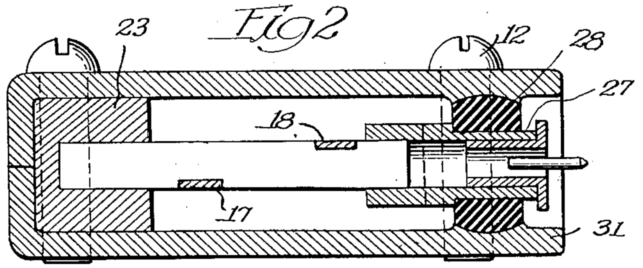
Fig. 2
Fig. 3
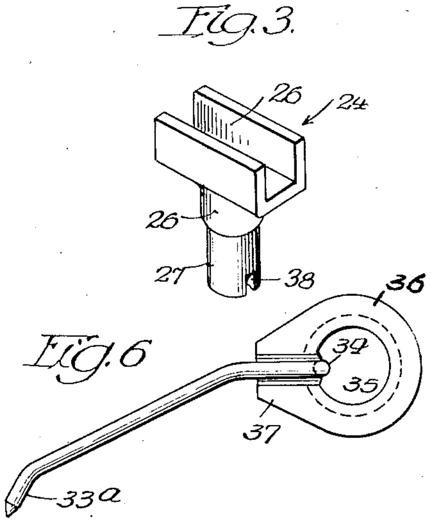
Fig. 3, Fig. 6
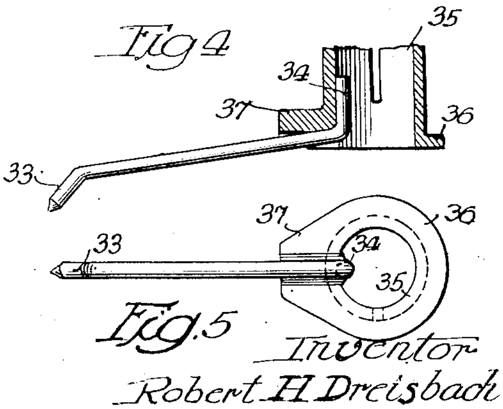
Fig. 4, Fig. 5
Inventor
Robert H Dreisbach
Clarence J. Loftus Atty.

Patented Aug. 14, 1951 2,564,054

UNITED STATES PATENT OFFICE 2,564,054

PHONOGRAPH PICKUP AND MECHANICAL MOTION CONVERTING SYSTEM THEREFOR

Robert H. Dreisbach, Fort Wayne, Ind., assignor to The Magnavox Company, Fort Wayne, Ind., a corporation of Delaware Application October 10, 1947, Serial No. 779,171

8 Claims. (Cl. 179—100.41)

The present invention relates to phonograph pick-up unit, and more particularly to an improved crystal pick-up cartridge.

In electric phonographs it is now common practice to employ crystal pick-up cartridges in the phonograph pick-up arm. In the design of crystal pick-up cartridges there are certain objectives which are deemed desirable. In order to provide improved reproducing characteristics of the pick-up it is desirable to obtain the proper compliance at the stylus tip. The inertia effect and the operating pressure at the stylus tip should be kept at certain minimum values. In many crystal pick-up cartridges heretofore produced it has been found that sound is radiated by the stylus, the pick-up, and the record and hence it is desired to reduce the sound thus radiated to a substantially inaudible amount. For good reproduction and for long life it is furthermore desired to provide for a minimum of record wear and a minimum of stylus wear. In spite of a minimum stylus wear it nevertheless is desirable to make provision for the replacement of the stylus. For the best operation it furthermore is desired to minimize the response of the stylus tip in a direction normal to the sound undulations in the record grooves. In other words the vertical motion of a stylus tip on a lateral record should be at a minimum, and the lateral motion should be at a minimum in the case of a vertical pick-up. It furthermore is also desirable to avoid the necessity of a critical adjustment of damping material such as has been encountered in many of the present pick-up designs.

In an attempt to approach certain of the aforementioned objectives it was found that crystal pick-ups as constructed in the past had a relatively limited frequency response of about 4,000 to 5,000 cycles. This limit was brought about by a design in which the moving mass was too great so that the motional impedance was too high. This condition required the record to do an appreciable amount of work thus resulting in wear of the stylus and of the record. Prior designs of crystal pick-up also had relatively low lateral compliance which, along with the large inertance, produced radiated sounds commonly termed "needle talk" and poor tracking of the modulated groove unless a needle pressure of the order of two ounces was employed. One of the reasons for the excessive mass was found to lie in the mass of the chuck, the drive shaft and the needle itself. An attempt has been made to improve the lateral compliance by connecting the drive shaft to the crystal through an intervening rubber pad.

In order to reduce the moving mass as much as possible one suggestion was made to eliminate the stylus chuck by providing only a hole in the drive shaft to receive the stylus.

In an attempt to reduce the motional impedance at the stylus tip and thereby reduce the needle talk together with record and stylus wear, numerous phonograph needles were designed with certain bent shapes some of which were to provide increased vertical compliance and others increased lateral compliance. The increase in vertical compliance produced a reduction in the needle talk which results from the upward thrust on the stylus as a result of the "pinch effect." The increase in lateral compliance produced a lateral motional impedance reduction thereby also reducing needle talk but at the same time reducing the efficiency and the high frequency response of the pick-up cartridge. The high frequency response suffered because the compliance in the stylus appeared ahead of the moving mass or inertia represented by the chuck and drive shaft of the pick-up unit. It therefore became apparent that a change in the shape of the phonograph needle was not a satisfactory answer to the problem.

In an attempt to overcome some of the disadvantages of crystal pick-up construction the moving mass was greatly reduced by making the drive rod and the stylus of relatively small wire. In such design a torsional compliance was realized in the drive rod which eliminated the necessity of rubber pads as a link between the drive rod and the crystal. However, such construction had very little vertical compliance. If the length of the stylus were increased to provide adequate lateral compliance at the stylus tip at low frequency, it was found that the first mode of vibration or resonance occurred within the range of frequencies which were to be reproduced by the pick-up unit. It further was found that the drive rod introduced additional resonance making it necessary to employ damping blocks in addition to the damping obtained from the bearings of the drive shaft. In the use of damping blocks it was found that their effect was very critical as to clamping pressure and temperature due to the inherent physical characteristics of the material employed. In a further attempt to increase the vertical compliance it was found that additional resonances were introduced at the higher frequency which also required damping.

In spite of the use of jewels or metal alloys for stylus tips of the so-called permanent type, it has been found necessary to make provision for the replacement of the stylus. In certain recent designs which provide for the replacement of the stylus a crank arm or chuck has been provided on the drive shaft which materially increased the size of the crank arm and reduced the high frequency response because of the mass involved. In such construction it furthermore was found that a high frequency resonant point would still occur within the range of frequencies which were to be reproduced thus making it necessary to employ damping material which as previously mentioned had certain critical characteristics. It is also to be noted that the mass of the crank arm is interposed between the crystal and the compliance of the stylus tip and hence the mass acts as a mechanical filter to reduce the high frequency response.

Another problem encountered heretofore was the substantial impossibility to maintain the chuck or crank arm perfectly vertical with respect to the surface of the record. Thus any vertical motion at the tip of the stylus would produce torsional motion of the drive shaft thus introducing distortion.

In accordance with the present invention a simplified mechanical system of converting the lateral motion at the stylus tip into a torsional motion at the crystal was employed to provide high compliance, low inertia, and low motional impedance in both the vertical and lateral directions at the stylus tip. By simplifying the mechanical linkage between the stylus tip and the crystal by reducing it in size and the number of elements involved, the number of modes of vibration of the system was reduced and the mass was kept at such a low value that additional damping was not required beyond that which is inherent in the bearings surrounding the drive shaft. With such construction it further was found that the only resonance apparent was in the stylus itself which then could be so designed as to make the resonance appear at a frequency higher than the highest frequency to be reproduced. It furthermore was found that by changing the shape and size of the stylus that the resonance could be made to appear between 9,000 and 15,000 cycles at such a low amplitude that the damping afforded by the bearings about the drive shaft could be effective because the mass of the drive shaft is relatively low. A simplified structure of this type obviates the disadvantages and problems encountered in prior designs and a lower motional impedance is obtained which tracks perfectly at twelve grams and extends the high frequency response to 9,000 cycles or higher and still affords easy replacement of the stylus.

It is an object of the present invention to provide an improved crystal pick-up cartridge for electric phonograph.

Another object of the present invention is to provide an improved crystal pick-up having a simplified mechanical system for converting the motion of the stylus tip into torsional motion at the crystal.

Another object of the present invention is to minimize the mass of the linkage between the stylus tip and the crystal to obviate the need for damping blocks.

Another object of the present invention is to provide an improved crystal pick-up cartridge having a minimum motional impedance of the stylus.

Another object of the present invention is to provide an improved crystal pick-up cartridge having a provision for a lightweight removable or replaceable stylus or needle.

Another object of the present invention is to provide an improved crystal pick-up cartridge employing a lightweight needle or stylus which is protected by the pick-up cartridge against accidental damage.

Another object of the present invention is to provide an improved crystal pick-up cartridge having a high compliance and low inertia.

Still another object of the present invention is to provide an improved crystal pick-up cartridge so arranged as to prevent the occurrence of mechanical resonance within the frequency range to be reproduced.

Still another object of the present invention is to provide in lateral phonograph record reproduction a crystal pick-up cartridge which is positioned vertically to the record.

Still another object of the present invention is to provide an improved crystal pick-up cartridge having a drive shaft fastened to a twister crystal on the axis about which the crystal twists.

A still further object of the present invention is to provide an improved crystal pick-up cartridge having a stylus arranged at right angles to the axis about which the crystal twists.

A still further object of the present invention is to provide an improved crystal pick-up cartridge so arranged as to render substantially inaudible sounds radiated by the stylus, pick-up and record.

A still further object of the present invention is to provide an improved crystal pick-up cartridge having minimum inertia effect and minimum operating pressure at the stylus tip.

A still further object of the present invention is to provide an improved crystal pick-up cartridge which will minimize record and stylus wear.

Still another object of the present invention is to provide an improved crystal pick-up cartridge having improved stylus tip compliance.

Still another object of the present invention is to provide an improved crystal pick-up cartridge having an extended and improved range or frequency response.

Other and further objects of the present invention subsequently will become apparent by reference to the following description taken in conjunction with the accompanying drawings wherein:

Figure 1 is a side view partially broken away showing a crystal pick-up cartridge in the position in which it is normally employed for reproducing laterally cut phonograph records;

Figure 2 is a cross-sectional view as seen in the direction of the arrows along the line 2—2 of Figure 1;

Figure 3 is a perspective view of one element employed in a cartridge illustrated in Figures 1 and 2;

Figure 4 is an enlarged view of the pick-up stylus or needle and a portion of its supporting structure;

Figure 5 is a bottom view of the phonograph needle shown in Figure 4; and

Figure 6 is a bottom view of a phonograph needle employed for the reproduction of vertically cut records.

In the accompanying drawings there is shown an improved crystal pick-up cartridge constructed in accordance with the present invention which has an outer casing 11 formed in two similar parts. The two portions of the casing 11 may be formed of stamped or die cast parts which are retained together by suitable fastening means such as rivets or tap screws 12. At the left side of Figure 1 the casing 11 has an opening 13 into which is fitted an electrical terminal support formed of a plurality of sheets or plates 14, 15 and 16 of suitable insulating material. The insulating support formed by these three sheets carries two pronged connectors or terminals 17 and 18 which are connected by relatively flat conductive strips 19 and 21 to a crystal 22. The crystal 22 has a generally trapezoidal configuration, and may be of bimorphous Rochelle type commonly called a twister crystal. Such crystals are commonly provided with conductive surfaces which make electrical contact with the flat conductive strips 19 and 21.

One edge of the crystal 22 is supported in a channel shaped rubber mounting 23, which as is apparent from Figure 2 fits between the top and bottom halves of the outer casing 11. The edge of the crystal opposite the one which is supported by the rubber channel 23 is mounted in a crystal driving member 24 shown in perspective in Figure 3. This driving member 24 has a channel portion 25 which engages opposite sides of the crystal 22. The channel portion 25 of the driving member 24 is connected to a tubular stem 26 which has a reduced diameter portion 27. Adjacent to the shoulder formed by the reduced diameter portion 27, with the larger tubular stem 26, there is mounted a rubber ring 28. Prior to engagement of the rubber ring 28 by the two halves of the case 11, this ring has a generally cylindrical configuration. The rubber ring 28 is engaged by the wall 29 of an opening in the lower wall of case 11 as may be seen from Figures 1 and 2. When viewed in cross-section the wall 29 has an arcuate configuration. The opening when viewed from the bottom of the casing 11, as seen in Figure 1, has a somewhat elliptical configuration. The opening 29, therefore, compresses to some extent the rubber ring 28 in such manner that the rubber is confined to the engaging surfaces of the curved wall 29, and does not extend appreciably beyond the wall of the casing 11 in either an upward or downward direction as seen in Figure 1.

From Figure 1 it will be noted that the lower wall which contains the torsional resilient bearing member 28 is located a short distance from a depending or outer guard rail 31. The outer guard rails 31 on opposite sides of the halves of the casing 11 form a channel to protect the stylus of the phonograph needle in event that the pick-up arm should happen to be dropped upon a phonograph record. The casing 11 in the proximity of the stylus is sufficiently cut back at 32 to permit this action on the part of the phonograph needle.

It will be noted that a minimum number of parts has thus far been employed in the assembly of the pick-up cartridge shown in the drawing. The crystal 22 has one edge supported by the block 23, and the opposite edge will be both supported and twisted by the driving member 24. The driving member 24 is relatively small and has a minimum mass. Fitted within the tubular portion of the driving member 24 is the support structure of a phonograph needle or stylus 33. The stylus 33 is formed of relatively small diameter wire which may have a tip of metal alloy of the type used in semi-permanent phonograph needles, or may have a tip provided with a jewel. At the inner end the wire stylus or needle 33 has an upturned portion 34 which is suitably secured by soldering, brazing or welding to a removable support sleeve 35 which has a flange or collar 36. The sleeve 35 and the collar 36 at one point are thrust upwardly so as to form a portion 37 which serves as a means for properly orienting the needle 33 with respect to the supporting sleeve 27 which is provided with a suitable keyway or notch 38. The notch 38 receives the key 37 of the supporting sleeve 35. A new stylus may be replaced by removing the collar 36 and withdrawing the stylus 33 from the driving member 24.

It will be noted that the simplified mechanical linkage between the stylus tip and the crystal is reduced both in size and in the number of elements involved. It is significant to note that no damping blocks are employed and that no crank arm is necessary for supporting the stylus or needle. The stylus shank itself functions as the crank with the members 34 and 35 acting as a crankshaft. This shaft transmits pure torsional motion to the crystal, yet supports the crystal against unwanted lateral movement. This arrangement reduces the number of modes of vibration of the mechanical system, and with the mass kept at a minimum value, additional damping is not required beyond that which is inherent in the rubber mounting ring 28 which surrounds the driving member 24.

The pick-up shown and described has a high compliance and low inertia which provide low motional impedance in both the vertical and lateral directions at the stylus tip. The lateral motion at the stylus tip is converted into torsional movement at the crystal and the only motional impedance appearing in the structure is the torsional moment of the drive shaft or tubular member 26 and 27 twisting about its own axis. Such construction has the further effect of eliminating any mechanical resonance between the crystal and the stylus. The only resonance which becomes evident is that of the stylus itself which by suitable design can be made so that the resonant period will fall within the range of 9,000 to 15,000 cycles per second. It further has been found that the mechanical resonance of the stylus is very low in amplitude and that the mass of the drive shaft is sufficiently low to permit damping to be afforded by the bearing member 28.

The low motional impedance of the pick-up unit permits the unit to track perfectly at a pressure of 12 grams and the high frequency response expands to 9,000 cycles per second or higher. On the basis of constant amplitude motion at the stylus tip, the output voltage of the pick-up cartridge is constant. In addition the easy replacement of the stylus is obtained without sacrificing any of the desirable characteristics. It has been found that the efficiency has been maintained sufficiently high that no additional amplification is required beyond that usually found in the audio system of a radio receiver. The low needle pressure is conducive to a minimum of wear of the stylus tip and wear of the phonograph record. This is accomplished because of the reduced mass of the components existing between the crystal and the stylus tip and the increased compliance as seen at the stylus tip. The increased vertical compliance because of the spring action in the stylus is a greater acceleration restoring force against the "pinch effect" than could be obtained by the action of gravity in the instance where the stylus is relatively rigid in the vertical direction.

In the arrangement thus far described it has been convenient to illustrate the application of the present invention to the reproduction of the more common laterally grooved phonograph record. It will be noted that for the reproduction of such records the crystal 22 is in a plane which is substantially normal to the plane of the undulations of the record grooves. From the representation of Figure 2 it will be noted that the crystal 22 is not only in a plane substantially perpendicular to the undulations in the groove of the phonograph record, but the axis of the crystal is also perpendicular to the plane of the phonograph record. For ready adaptation of the pick-up cartridge to the pick-up arm and for other manufacturing reasons the arrangement shown has been employed, and hence the stylus 33 has a bent tip. By rotating the crystal 22 in its present plane as seen in Figure 1 sufficiently, the stylus 33 might be employed without the bent tip portion.

Where the pick-up cartridge is to be employed for reproduction of vertically cut records, the crystal 22 is positioned in a substantially horizontal plane so that it again is in a plane perpendicular to the sound undulations in the phonograph record groove. For such reproduction the cartridge of Figure 1 is provided with a stylus or phonograph needle such as that shown in Figure 6 from which it will be noted that the stylus **33*a* has a bent tip arranged in a plane substantially perpendicular to the tip of the stylus 33** in Figure 4.

It has been found that for the reproduction of both types of phonograph records and transcriptions that the over-all response characteristic is a relatively flat curve which extends considerably beyond the limits of the frequencies commonly recorded on transcriptions and records. In one embodiment of the invention it was found that a good response was obtained through frequencies as high as 14,000 cycles per second.

While for the purpose of illustrating and describing the present invention, a preferred embodiment has been illustrated in the drawings, it is to be understood that the invention is not to be limited thereby since such variations in the construction and in the components are contemplated as may be commensurate with the spirit and scope of the invention as set forth in the following claims.

What I desire to protect by United States Letters Patent is claimed:

1. In a phonograph pickup having a vertically disposed torsional type of crystal, a mechanical system for converting the motion of a stylus into torsional motion of said crystal, said system comprising a straight crank shaft fixed at one end to said crystal with its longitudinal axis substantially perpendicular to the plane of the undulations of the record groove and coextensive with the vertical axis of said crystal, and a crank fixed to said crank shaft at the other end thereof for imparting torsional motion to said crank shaft, said crank comprising a stylus having a slender wire-like shank extending radially and downwardly from said shaft to said groove, said stylus having substantial vertical and horizontal compliance.

2. In a phonograph pickup having a vertically disposed torsional type of crystal, a mechanical system for converting the motion of a stylus into torsional motion of said crystal, said system comprising a crank shaft fixed at one end to said crystal with its longitudinal axis substantially perpendicular to the plane of the undulations of the record groove and coextensive with the vertical axis of said crystal, and a crank fixed to said crank shaft at the other end thereof for imparting torsional motion to said crank shaft, said crank comprising a stylus having a slender wire-like shank extending radially and substantially parallel to the plane of the undulations of said groove, said stylus having substantial vertical and horizontal compliance.

3. In a phonograph pickup having a vertically disposed torsional type of crystal, a mechanical system for converting the motion of a stylus into torsional motion of said crystal, said system comprising means including a bearing extending along the vertical axis of said crystal, a crank shaft fixed at one end to said crystal and journalled in said bearing with its longitudinal axis substantially perpendicular to the plane of the undulations of the record groove and coextensive with said vertical axis, and a crank fixed to said crank shaft at the other end thereof for imparting torsional motion to said crank shaft, said crank comprising a stylus having a slender wire-like shank extending radially and substantially parallel to the plane of the undulations of said groove, said stylus having substantial vertical and horizontal compliance.

4. In a phonograph pickup having a vertically disposed torsional type of crystal, a mechanical system for converting the motion of a stylus into torsional motion of said crystal, said system comprising means for supporting said crystal, said means including a bearing aperture extending therethrough along the vertical axis of said crystal, a bearing fixed in said aperture, a crank shaft fixed at one end to said crystal and journalled in said bearing with its longitudinal axis substantially perpendicular to the plane of the undulations of the record groove and coextensive with said vertical axis, and a crank fixed to said crank shaft at the other end thereof for imparting torsional motion to said crank shaft, said crank comprising a stylus having a slender wire-like shank extending radially and substantially parallel to the plane of the undulations of said groove, said stylus having substantial vertical and horizontal compliance.

5. In a phonograph pickup having a vertically disposed torsional type of crystal, a mechanical system for converting the motion of a stylus into torsional motion of said crystal, said system comprising a hollow casing for supporting said crystal, said casing including a bearing aperture extending therethrough along the vertical axis of said crystal, a resilient bearing fixed at one end in said aperture, a crank shaft fixed to said crystal and journalled in said bearing with its longitudinal axis substantially perpendicular to the plane of the undulations of the record groove and coextensive with said vertical axis, and a crank fixed to said crank shaft at the other end thereof for imparting torsional motion to said crank shaft, said crank comprising a stylus having a slender wire-like shank extending radially and substantially parallel to the plane of the undulations of said groove, said stylus having substantial vertical and horizontal compliance.

6. A phonograph pick-up adapted to cooperate with a record groove and comprising a rotational type of electro-mechanical transducer adapted to be operated with its axis of rotational movement in a plane substantially vertical with respect to the plane of the undulations of said record groove, means for supporting said transducer with said axis in said vertical plane and means for providing rotational movement of said transducer about said axis comprising a crankshaft fixed at one end to said transducer with the longitudinal axis of said shaft coextensive with said rotational axis, and a crank fixed to said crankshaft at the other end thereof for imparting rotational motion to said crankshaft, said crankshaft comprising a stylus having a slender wire-like shank extending radially and downwardly from said shaft to said groove, said stylus having substantial vertical and horizontal compliance.

7. A phonograph pick-up adapted to cooperate with a record groove and comprising a torsional type of crystal adapted to be operated with its axis of torsional movement in a plane substantially vertical with respect to the plane of the undulations of said record groove, means for supporting one end of said crystal with said axis in said vertical plane and means for providing torsional movement of said crystal about said axis comprising a straight crankshaft fixed at one end to the other end of said crystal with the longitudinal axis of said shaft coextensive with the torsional axis of said crystal, and a crank fixed to said crankshaft at the other end thereof for imparting torsional motion to said crankshaft, said crankshaft comprising a stylus having a slender wire-like shank extending radially from said shaft to said groove, said stylus having substantial vertical and horizontal compliance.

8. A phonograph pick-up adapted to cooperate with a record groove and comprising a torsional type of crystal adapted to be operated with its axis of torsional movement in a plane substantially vertical with respect to the plane of the undulations of said record groove, means including a casing for supporting one end of said crystal with said axis in said vertical plane and means for providing torsional movement of said crystal about said axis comprising a bearing in said casing and extending along said axis, a straight crankshaft journaled in said bearing and fixed at one end to the other end of said crystal with the longitudinal axis of said shaft coextensive with the torsional axis of said crystal, and a crank fixed to said crankshaft at the other end thereof for imparting torsional motion to said crankshaft, said crankshaft comprising a stylus having a slender wire-like shank extending radially and downwardly from said shaft to said groove, said stylus having substantial vertical and horizontal compliance.

ROBERT H. DREISBACH.

REFERENCES CITED

The following references are of record in the file of this patent:

UNITED STATES PATENTS

| Number | Name | Date |
|---|---|---|
| 890,777 | Levin | June 16, 1908 |
| 1,737,253 | Linsell | Nov. 26, 1929 |
| 1,761,831 | Hough | June 3, 1930 |
| 1,893,796 | Coleman | Jan. 10, 1933 |
| 2,320,416 | Dally | June 1, 1943 |
| 2,313,129 | Dohan | Mar. 9, 1943 |
| 2,326,424 | Andres | Aug. 10, 1943 |
| 2,326,460 | Hasbrouck | Aug. 10, 1943 |
| 2,328,952 | Burt | Sept. 7, 1943 |
| 2,363,497 | Begun | Nov. 28, 1944 |
| 2,385,945 | Schmidt | Oct. 2, 1945 |
| 2,451,221 | Hutter | Oct. 12, 1948 |

FOREIGN PATENTS

| Number | Country | Date |
|---|---|---|
| 849,531 | France | Aug. 21, 1939 |

Certificate of Correction

Patent No. 2,564,054

August 14, 1951

ROBERT H. DREISBACH

It is hereby certified that error appears in the printed specification of the above numbered patent requiring correction as follows:

Column 8, line 57, strike out "at one end" and insert the same in line 58, after "fixed";

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*